US012676057B2

(12) United States Patent
Gong et al.

(10) Patent No.: US 12,676,057 B2
(45) Date of Patent: Jul. 7, 2026

(54) TACTILE SIGNAL GENERATION METHOD, READABLE MEDIUM, AND ELECTRONIC DEVICE

(71) Applicant: Beijing Youzhuju Network Technology Co., Ltd., Beijing (CN)

(72) Inventors: Yuzhou Gong, Beijing (CN); Yangfei Xu, Beijing (CN); Zejun Ma, Beijing (CN)

(73) Assignee: Beijing Youzhuju Network Technology Co., Ltd., Beijing (CN)

( * ) Notice: Subject to any disclaimer, the term of this patent is extended or adjusted under 35 U.S.C. 154(b) by 0 days.

(21) Appl. No.: 18/865,238

(22) PCT Filed: May 11, 2023

(86) PCT No.: PCT/CN2023/093484
§ 371 (c)(1),
(2) Date: Nov. 12, 2024

(87) PCT Pub. No.: WO2023/217224
PCT Pub. Date: Nov. 16, 2023

(65) Prior Publication Data
US 2025/0316149 A1 Oct. 9, 2025

(30) Foreign Application Priority Data
May 12, 2022 (CN) .......................... 202210519682.1

(51) Int. Cl.
*H04B 3/36* (2006.01)
*G06F 3/16* (2006.01)
*G08B 6/00* (2006.01)

(52) U.S. Cl.
CPC *G08B 6/00* (2013.01); *G06F 3/16* (2013.01)

(58) Field of Classification Search
CPC ... G08B 6/00; G06F 3/16; G06F 3/016; G06F 17/142
See application file for complete search history.

(56) References Cited

U.S. PATENT DOCUMENTS 10,748,391 B2 * 8/2020 Grant ..................... G08B 25/10
11,314,344 B2 * 4/2022 Chin .................... H04L 67/303
(Continued)

FOREIGN PATENT DOCUMENTS

CN 1599925 A 3/2005
CN 101090386 A 12/2007
(Continued)

OTHER PUBLICATIONS

International Patent Application No. PCT/CN2023/093484; Int'l Written Opinion and Search Report; dated Jul. 29, 2023; 8 pages.
(Continued)

*Primary Examiner* — Toan N Pham
(74) *Attorney, Agent, or Firm* — BakerHostetler

(57) ABSTRACT

A tactile signal generation method, a computer readable medium, and an electronic device are provided. The method includes: determining a target frequency domain signal corresponding to a target audio signal to be processed; dividing the target frequency domain signal into a plurality of sub-bands, and determining a target energy value of each of the sub-bands; determining, from a plurality of alternative mapped frequency combinations, a target frequency combination capable of achieving a best tactile feedback effect on a tactile feedback device; and obtaining a tactile feedback signal for tactile feedback according to the target frequency combination.

19 Claims, 2 Drawing Sheets

(56) References Cited

U.S. PATENT DOCUMENTS

| | | |
|---|---|---|
| 2009/0231276 A1 | 9/2009 | Ullrich et al. |
| 2012/0206247 A1 | 8/2012 | Bhatia et al. |
| 2016/0025615 A1 | 1/2016 | Fishel et al. |
| 2024/0045505 A1* | 2/2024 | Payal ........................ G06F 3/16 |
| 2024/0087434 A1* | 3/2024 | Meng ...................... G06F 3/016 |

FOREIGN PATENT DOCUMENTS

| CN | 103677249 A | 3/2014 |
|---|---|---|
| CN | 108874144 A | 11/2018 |
| CN | 109144257 A | 1/2019 |
| CN | 109407846 A | 3/2019 |
| CN | 110032272 A | 7/2019 |
| CN | 110096136 A | 8/2019 |
| CN | 110917613 A | 3/2020 |
| CN | 108874144 B | 6/2020 |
| CN | 111381707 A | 7/2020 |
| CN | 112466267 A | 3/2021 |
| CN | 112933590 A | 6/2021 |
| CN | 112954115 A | 6/2021 |
| CN | 113851114 A | 12/2021 |
| CN | 114299982 A | 4/2022 |
| CN | 114995638 A | 9/2022 |
| CN | 114995638 B | 8/2024 |
| EP | 2703951 A2 | 3/2014 |
| EP | 2846218 A1 | 3/2015 |
| WO | WO 2020/158036 A1 | 8/2020 |

OTHER PUBLICATIONS

China Patent Application No. 202210519682.1; First Office Action; dated Apr. 24, 2024; 14 pages.
China Patent Application No. 202210519682.1; Notification to Grant; dated Jul. 1, 2024; 6 pages.
European Patent Application No. 23802993.8; Extended Search Report; dated Apr. 9, 2026; 11 pages.

\* cited by examiner

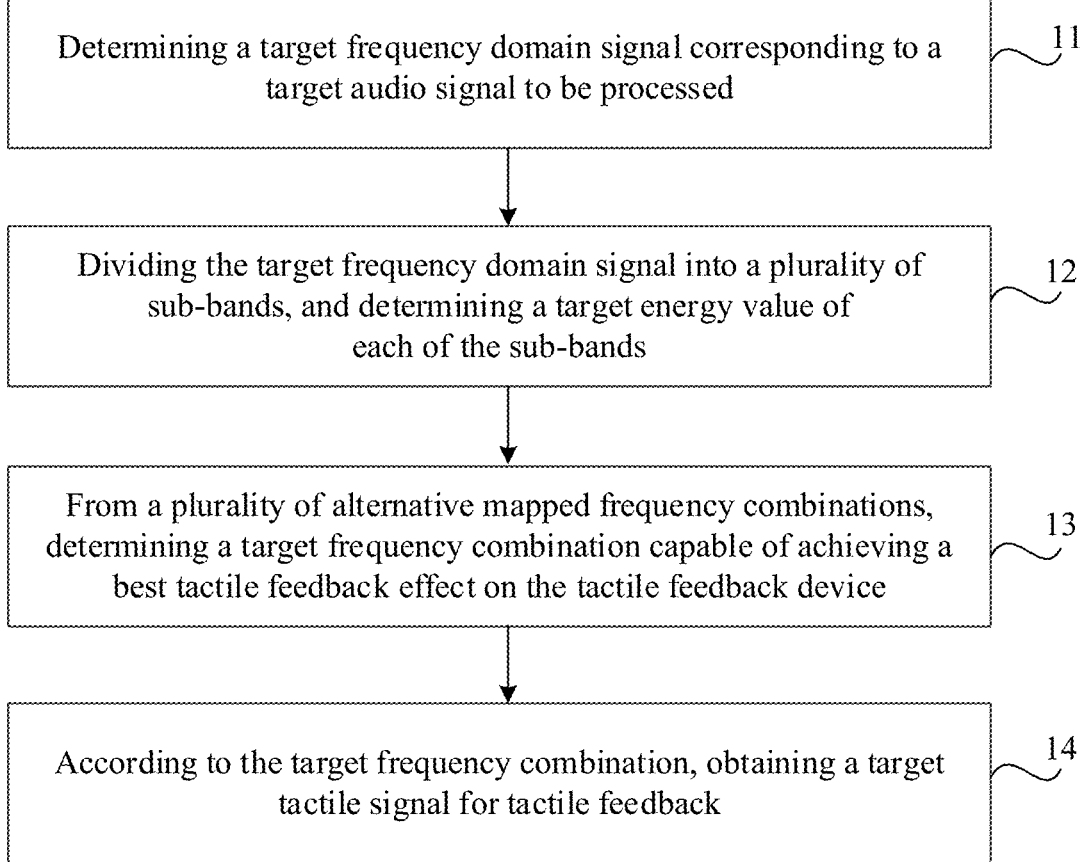

Determining a target frequency domain signal corresponding to a target audio signal to be processed ~ 11

Dividing the target frequency domain signal into a plurality of sub-bands, and determining a target energy value of each of the sub-bands ~ 12

From a plurality of alternative mapped frequency combinations, determining a target frequency combination capable of achieving a best tactile feedback effect on the tactile feedback device ~ 13

According to the target frequency combination, obtaining a target tactile signal for tactile feedback ~ 14

TACTILE SIGNAL GENERATION METHOD, READABLE MEDIUM, AND ELECTRONIC DEVICE

This is a national stage application filed under 37 U.S.C. 371 based on International Patent Application No. PCT/CN2023/093484, filed on May 11, 2023, which claims priority to Chinese Patent Application No. 202210519682.1 filed on May 12, 2022, the disclosures of which are incorporated herein by reference in their entireties.

TECHNICAL FIELD

Embodiments of the present disclosure relate to a tactile signal generation method, apparatus, computer readable medium, and electronic device.

BACKGROUND

Currently, in game, movie, and immersive VR (Virtual Reality) scenarios, devices are often required to have tactile feedback functions. For example, in the process of a VR game, when a user manipulates the handle to play the game, the user may expect the handle to generate a corresponding tactile feedback (e.g., vibration feedback) according to the operation of the user, so as to make the user clear whether or not the operation is in effect. In some cases, the mechanism of tactile feedback is the conversion of audio to tactile, however, the current tactile feedback still has the problem of poor feedback.

SUMMARY

This section of content is provided to briefly introduce the concept, which will be described in detail in the section of specific embodiments later. This section is not intended to identify the key or necessary features of the technical solution requiring protection, and not intended to limit the scope of the technical solution requiring protection.

In a first aspect, the embodiments of the present disclosure provide a tactile signal generation method, the method includes:

determining a target frequency domain signal corresponding to a target audio signal to be processed;

dividing the target frequency domain signal into a plurality of sub-bands, and determining a target energy value of each of the sub-bands;

determining, from a plurality of alternative mapped frequency combinations, a target frequency combination capable of achieving a best tactile feedback effect on a tactile feedback device; and obtaining a tactile feedback signal for tactile feedback according to the target frequency combination.

In a second aspect, the embodiments of the present disclosure provide a tactile signal generating apparatus, the apparatus includes:

a first determination module, configured to determine a target frequency domain signal corresponding to a target audio signal to be processed;

a second determination module, configured to divide the target frequency domain signal into a plurality of sub-bands, and determine a target energy value of each of the sub-bands;

a third determination module, configured to determine, from a plurality of alternative mapped frequency combinations, a target frequency combination capable of achieving a best tactile feedback effect on a tactile feedback device; and a processing module, configured to obtain a tactile feedback signal for tactile feedback according to the target frequency combination.

In a third aspect, the embodiments of the present disclosure provide a computer readable medium, which stores a computer program thereon, the computer program, when executed by a processing device, implements the tactile signal generation method in the first aspect of the present disclosure.

In a fourth aspect, the embodiments of the present disclosure provide an electronic device, which includes:

a storage apparatus, storing at least one computer program thereon; and at least one processing apparatus, configured to execute the at least one computer program in the storage apparatus to implement the tactile signal generation method in the first aspect of the present disclosure.

With the above technical solution, a target frequency domain signal corresponding to a target audio signal to be processed is determined, the target frequency domain signal is divided into a plurality of sub-bands, and a target energy value of each sub-band is determined, a target frequency combination capable of obtaining the best tactile feedback effect on a tactile feedback device is determined from a plurality of alternative mapped frequency combinations, and a target tactile signal for tactile feedback is obtained according to the target frequency combination. Thereby, the mapped frequency combination of the best effect can be automatically selected without manual adjustment by a human, the feedback is more accurate and efficient, and the human cost is greatly reduced.

The other features and advantages of the present disclosure will be explained in detail in the subsequent section of specific embodiments.

BRIEF DESCRIPTION OF DRAWINGS

The above and other features, advantages, and aspects of each embodiment of the present disclosure may become more apparent by combining drawings and referring to the following specific implementation modes. In the drawings throughout, same or similar drawing reference signs represent same or similar elements. It should be understood that the drawings are schematic, and originals and elements may not necessarily be drawn to scale. In the accompanying drawings:

FIG. 1 is a flowchart of a tactile signal generation method provided by the embodiments of the present disclosure;

DETAILED DESCRIPTION

Figures 2, 3:
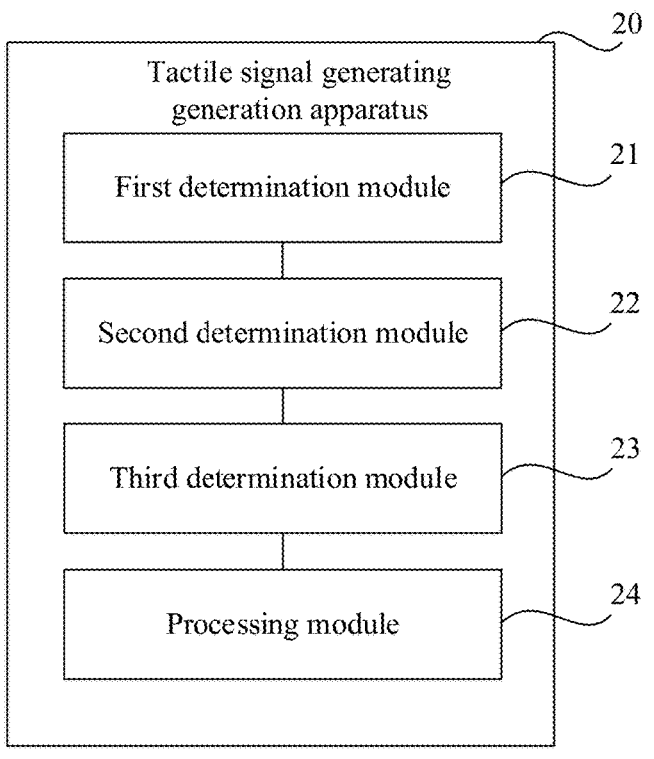
FIG. 2 is a block diagram of a tactile signal generation apparatus provided by the embodiments of the present disclosure.
FIG. 3 is a structural schematic diagram of an electronic device provided by the embodiments of the present disclosure.

Embodiments of the present disclosure are described in more detail below with reference to the drawings. Although certain embodiments of the present disclosure are shown in the drawings, it should be understood that the present disclosure may be achieved in various forms and should not be construed as being limited to the embodiments described here. On the contrary, these embodiments are provided to understand the present disclosure more clearly and completely. It should be understood that the drawings and the embodiments of the present disclosure are only for exemplary purposes and are not intended to limit the scope of protection of the present disclosure.

It should be understood that various steps recorded in the implementation modes of the method of the present disclosure may be performed according to different orders and/or performed in parallel. In addition, the implementation modes of the method may include additional steps and/or steps omitted or unshown. The scope of the present disclosure is not limited in this aspect.

The term "including" and variations thereof used in this article are open-ended inclusion, namely "including but not limited to". The term "based on" refers to "at least partially based on". The term "one embodiment" means "at least one embodiment"; the term "another embodiment" means "at least one other embodiment"; and the term "some embodiments" means "at least some embodiments". Relevant definitions of other terms may be given in the description hereinafter.

It should be noted that concepts such as "first" and "second" mentioned in the present disclosure are only used to distinguish different apparatuses, modules or units, and are not intended to limit orders or interdependence relationships of functions performed by these apparatuses, modules or units.

It should be noted that modifications of "one" and "more" mentioned in the present disclosure are schematic rather than restrictive, and those skilled in the art should understand that unless otherwise explicitly stated in the context, it should be understood as "one or more".

The names of messages or information interacted between devices in the embodiments of the present disclosure are for illustrative purposes only and are not intended to limit the scope of such messages or information.

All actions to obtain signals, information, or data in the embodiments of the present disclosure are carried out in accordance with the corresponding data protection regulations and policies of the country where the actions occur, and with authorization from the corresponding device owner.

It can be understood that, before using the technical solution provided by the embodiments of the present disclosure, the user should be informed of the type, use range, use scenario, and the like of the personal information to which the technical solution of the present disclosure relates and the authorization of the user should be obtained in an appropriate manner in accordance with the relevant laws and regulations.

For example, in response to receiving the user's active request, prompt information is sent to the user to explicitly prompt the user that the operation that he requests to perform will require acquisition and use of personal information of the user. Thus, it is possible for the user to autonomously select whether to provide personal information to software or hardware such as an electronic device, an application program, a server, or a storage medium, which performs the operation of the technical solution of the present disclosure, according to the prompt information.

As an alternative but non-limiting implementation, in response to receiving the user's active request, the manner in which the prompt information is sent to the user may be, for example, in the form of a pop-up window in which the prompt information may be presented in the form of text. In addition, the pop-up window may also provide a selection control for the user to select "agree" or "disagree" to provide personal information to the electronic device.

It should be understood that the above notification and process for obtaining user authorization is merely illustrative and do not constitute a limitation to embodiments of the present disclosure, and other ways of satisfying the relevant laws and regulations can also be applied in the embodiments of the present disclosure.

At the same time, it can be understood that the data to which the technical solution of the present disclosure relates (including but not limited to the data itself, the acquisition or use of the data) should comply with the requirements of the corresponding laws and regulations and related regulations.

FIG. 1 is a flowchart of a tactile signal generation method provided by the embodiments of the present disclosure. As shown in FIG. 1, the method provided by the embodiments of the present disclosure may include steps 11-14.

Step 11: determining a target frequency domain signal corresponding to a target audio signal to be processed.

The target audio signal is a time-domain audio signal.

Exemplarily, the target frequency domain signal may be obtained by performing a Fast Fourier Transform (FFT) process on the target audio signal. The number of FFT points can be chosen according to the sampling rate and the computational complexity, for example, 512 points or 256 points are chosen, and accordingly, 257 or 129 frequency domain signals can be obtained as target frequency domain signals.

Step 12: dividing the target frequency domain signal into a plurality of sub-bands, and determining a target energy value of each of the sub-bands.

When the target frequency domain signal is divided, the number of sub-bands divided may be selected according to actual requirements. For example, the number of sub-bands divided may be chosen (e.g., an integer ranging from 3 to 7) according to the requirements of tactile feedback, computational complexity, and the like.

After division is completed, the target energy value of each of the sub-bands may be determined based on the data after sub-band division.

In one possible implementation, the step 12 may include the following steps:

dividing the target frequency domain signal into a plurality of sub-bands;

determining an instantaneous energy value of each of the sub-bands;

performing mean filtering processing on the instantaneous energy value of the sub-band to obtain a filtered energy value of each of the sub-bands; and normalizing the filtered energy value to obtain the target energy value of each of the sub-bands.

After dividing the target frequency domain signal into a plurality of sub-bands, the sum of the energy of each sub-band at a given time instant, i.e., the instantaneous energy value of the sub-band, may be calculated first.

In general, the data of the instantaneous energy value is strongly jumping, which may not be conducive to subsequent data processing, and therefore the instantaneous energy value may be processed using the method of mean filtering for smoothness of the data. For example, the instantaneous energy of the target frequency domain signal after sub-band division may be mean filtered in the time dimension, resulting in a sub-band energy envelope including the filtered energy value of each sub-band. The length of the filter can be selected as needed based on the response delay and the smoothness of the envelope, the longer the length of the filter, the smoother the sub-band energy envelope, and accordingly, the larger the response delay for the conversion from the audio signal to the tactile signal. For example, the length of the filter may be 5 and the corresponding response delay will be within 6 ms.

After obtaining the filtered energy value of each sub-band, the filtered energy value may be normalized. The normalization process may refer to the following manner.

Calculating an instantaneous gain value based on the filtered energy value of each sub-band, i.e., the sub-band energy envelope;

Using a long-term smoothing method to obtain a noise level of the sub-band energy envelope of each sub-band, when the instantaneous gain value of the sub-band is less than or equal to the noise level, no additional processing is performed for the instantaneous gain value, when the instantaneous gain value of the sub-band is less than or equal to the noise level, smoothing the gain value of the sub-band audio energy envelope in the time dimension, the rate of the smoothing may depend on the ratio of the gain of the previous frame to the current instantaneous gain value;

Finally, multiplying the above gain value (the updated gain value, or non-updated gain value) by the data on the sub-band energy envelope sequentially, to obtain the normalized sub-band energy envelope, i.e., the target energy value of each sub-band.

For example, when the ratio r of the gain of the previous frame t−1 and the instantaneous gain value of the current frame t is greater than 4, the gain value of the frame t may be 0.75 times the gain value of the frame t−1; when the ratio r is greater than 2 and less than 4, the gain value of the frame t may be 0.81 times the gain value of the frame t−1; when the ratio r is greater than 1 and less than 2, the gain value of the frame t may be 0.92 times the gain value of the frame t−1; when the ratio r is less than 0.2, the gain value of the frame t may be 1.3 times the gain value of the frame t−1; when the ratio r is greater than 0.2 and less than 0.5, the gain value of the frame t may be 1.1 times the gain value of the frame t−1; and when the ratio r is greater than 0.5 and less than 1, the gain value of the frame t may be 1.02 times the gain value of the frame t−1.

By normalizing the audio signal energy of each sub-band in the time dimension through the above method, it is possible to ensure that the tactile signals converted from different audios are not affected by the volume of the audio itself. That is, a unified interface is provided for the conversion of audio to tactile, to adjust the tactile effect as a whole. Further, the user can adjust the intensity of the tactile output by the tactile feedback device (e.g., vibration motor) as a whole according to his or her own needs through this unified interface, without having to manually adjust for each audio file, thereby improving the user's experience.

Step 13: from a plurality of alternative mapped frequency combinations, determining a target frequency combination capable of achieving a best tactile feedback effect on the tactile feedback device.

In the present disclosure, the tactile signal may be a vibration signal, and correspondingly, the tactile feedback device may be a vibration motor.

In one possible implementation, the step 13 may include the following steps:

acquiring sample data;

determining a corresponding relationship between a tactile intensity and a frequency;

for each of the alternative mapped frequency combinations, determining an error value of the alternative mapped frequency combination based on the frequency reference value, the tactile intensity reference value, and the corresponding relationship; and determining an alternative mapped frequency combination corresponding to a smallest error value as the target frequency combination.

The sample data includes a tactile intensity reference value and a frequency reference value determined based on a plurality of audio signal samples.

In the embodiments of the present disclosure, a plurality of audio signal samples for which an ideal tactile feedback effect is desired may be collected as sample data. In this case, the frequency response curve of the tactile feedback device can be fitted non-linearly to obtain a functional relationship between the tactile intensity and the frequency, that is, the corresponding relationship between the tactile intensity and the frequency.

Then, the audio signal sample may be subjected to the processing of the target audio signal as described above, to obtain a sub-band energy value corresponding to the audio signal sample.

The frequency reference value may be selected according to actual requirements for data calibration of tactile intensity. For example, the frequency reference may be a resonant frequency of the tactile feedback device. All sub-band energy values in the sample data may be mapped to the frequency reference value to generate a tactile signal for tactile intensity calibration, and the tactile signal may be coupled to the tactile feedback device, and the calibration personnel may determine the calibration parameter corresponding to each audio signal based on real-time tactile feedback, and obtain a tactile intensity reference value of each audio signal.

Exemplarily, the tactile signal and the tactile intensity reference value may be calculated with reference to the following formula:

$$St = \alpha * E * \sin(2\pi * \frac{f0}{fs} t),$$

$$Ht = \sum_{t=0}^{T} |St|.$$

St is the tactile signal used for tactile intensity calibration at time t, St is a sine wave signal with a single frequency, and the frequency is $2*\pi*f0/fs$, f0 is the frequency reference value, fs is the sampling rate, $\alpha$ is the calibration parameter, E is the sub-band energy value corresponding to the audio signal sample, and t is a time frame number of 0-T. For example, when the tactile signal is a vibration signal, the tactile intensity reference value Ht may characterize the vibration intensity.

The calculation method for the tactile intensity reference value Ht is to, with a frequency of $2*\pi*f0/fs$, calibrate the product of the parameter a and the sub-band energy value corresponding to the audio signal sample as the amplitude, to generate an average amplitude value of the sine wave in the time dimension.

After the above parameter is determined, an alternative mapped frequency combination may be selected.

In one possible implementation, the alternative mapped frequency combination may be determined by:

according to the corresponding relationship between the tactile intensity and the frequency, determining a plurality of frequencies capable of uniformly distributing the tactile intensity as the alternative mapped frequency combination.

That is, according to the determined corresponding relationship of the tactile intensity and the frequency in the previous step, a plurality of sets of frequencies may be selected as alternative mapped frequencies, and the selection should be such that the selected set of frequencies makes the tactile intensity uniformly distributed.

In another possible implementation, the alternative mapped frequency combination can be determined by:

according to the resonance frequency of the tactile feedback device, determining a target frequency interval including the resonance frequency, and determining a set of frequencies from the target frequency interval as the alternative mapped frequency combination.

That is, the resonance frequency of the tactile feedback device is taken as the frequency reference value. For example, 30 Hz above and below the resonance frequency may be chosen to constitute the target frequency interval from which sets of frequencies may be selected as the alternative mapped frequencies.

Since the power consumption of the tactile feedback device is minimal at the resonance frequency, the power consumption of the tactile feedback device can be effectively reduced by using the resonance frequency of the tactile feedback device as an optimization target.

In one possible implementation, the determining the error value of the alternative mapped frequency combination according to the frequency reference value, the tactile intensity reference value and the corresponding relationship may include the following steps:

determining a first tactile intensity corresponding to the alternative mapped frequency combination according to the alternative mapped frequency combination and the corresponding relationship;

determining a mean square error between the first tactile intensity and the tactile intensity reference value as a first mean square error;

determining a mean squared error between the alternative mapped frequency combination and the frequency reference value as a second mean squared error; and determining the error value of the alternative mapped frequency combination based on a sum of the first mean squared error and the second mean squared error Exemplarily, the first tactile intensity may be calculated by the following formula:

$$Sn = \sum_{f}^{Fn}\left(G(f) * E * \sin(2\pi * \frac{f}{fs}t)\right),$$

$$Hn = \sum_{t=0}^{T}|Sn|.$$

Sn is the tactile signal corresponding to the alternative mapped frequency combination at time t with a frequency of $2*\pi*f/fs$, fs is the sampling rate, Fn is the alternative mapped frequency combination (i.e., the alternative mapped frequency combination for the current computation), $\alpha$ is the calibration parameter, E is the sub-band energy value corresponding to the audio signal sample, t is a time frame number of 0-T, and G(f) is the corresponding relationship between the tactile intensity and the frequency. The calculation method of the first tactile intensity Hn is consistent with the calculation method of the tactile intensity reference value Ht, which is not repeated here.

Exemplarily, the error value cost of the alternative mapped frequency combination may be determined by the following formula:

$$cost = \sum_{f}^{Fn}(Hn - Ht)^2 + \sum_{f}^{Fn}(f - f0)^2.$$

The meanings of Hn, Ht, f, f0, Fn are given in the formula provided above, and are not repeated here. In the above calculation formula, the left half of the right side of the equation is used to calculate the first mean square error, and the right half of the right side of the equation is used to calculate the second mean square error.

Thus, based on the above formula, an error value corresponding to each alternative mapped frequency combination can be obtained by calculating for each alternative mapped frequency combination.

Thus, by introducing the tactile intensity reference value and the frequency reference value into the error value and using the error value as a criterion for the tactile feedback effect, selecting a target frequency combination with the objective of minimizing the overall difference between the two, the tactile feedback effect can satisfy a desired value, and the power consumption of the tactile feedback device can be reduced, which is beneficial for achieving an optimal tactile feedback effect.

Step 14: according to the target frequency combination, obtaining a target tactile signal for tactile feedback.

In one possible implementation, the step 14 may include the following steps:

mapping a target energy value of each of the sub-bands to a tactile signal component based on the target frequency combination; and superimposing the tactile signal component to obtain the target tactile signal for tactile feedback.

The mapping of the target energy value of each sub-band to a tactile signal component may be achieved by:

for a target energy value of each of the sub-bands, according to the target energy value and a target frequency corresponding to the target energy value in the target frequency combination, generating a sine wave signal having a frequency of the target frequency and an energy of the target energy value as the tactile signal component corresponding to the target energy value.

Thereafter, the obtained tactile signal components are superimposed to obtain the target tactile signal for tactile feedback, which is then sent to the tactile feedback device, and the tactile feedback device provides the tactile feedback.

For example, the target tactile signal for tactile feedback may be calculated according to the following formula:

$$H(t) = \sum_{f}^{Fn}\left(E(f, t) * \sin(2\pi * \frac{f}{fs}t)\right).$$

H(t) is the target tactile signal for tactile feedback at time t, Fn is the target frequency combination, and E(f, t) is the target energy value at time t of a sub-band corresponding to the frequency f in the target frequency combination.

With the above technical solution, a target frequency domain signal corresponding to a target audio signal to be processed is determined, the target frequency domain signal is divided into a plurality of sub-bands, and a target energy value of each sub-band is determined, a target frequency combination capable of obtaining the best tactile feedback effect on a tactile feedback device is determined from a plurality of alternative mapped frequency combinations, and a target tactile signal for tactile feedback is obtained according to the target frequency combination. Thereby, the mapped frequency combination of the best effect can be automatically selected without manual adjustment by a human, the feedback is more accurate and efficient, and the human cost is greatly reduced.

FIG. 2 is a block diagram of a tactile signal generation apparatus provided by the embodiments of the present disclosure. As shown in FIG. 2, the apparatus 20 includes:

a first determination module 21, configured to determine a target frequency domain signal corresponding to a target audio signal to be processed;

a second determination module 22, configured to divide the target frequency domain signal into a plurality of sub-bands, and determine a target energy value of each of the sub-bands;

a third determination module 23, configured to determine, from a plurality of alternative mapped frequency combinations, a target frequency combination capable of achieving a best tactile feedback effect on a tactile feedback device; and a processing module 24, configured to obtain a tactile feedback signal for tactile feedback according to the target frequency combination.

Optionally, the third determination module 23 includes:

an acquisition sub-module, configured to obtain sample data, in which the sample data includes a tactile intensity reference value and a frequency reference value determined based on a plurality of audio signal samples;

a first determination sub-module, configured to determine a corresponding relationship between a tactile intensity and a frequency;

a second determination sub-module, configured to, for each of the alternative mapped frequency combinations, determining an error value of the alternative mapped frequency combination based on the frequency reference value, the tactile intensity reference value, and the corresponding relationship; and a third determination sub-module, configured to determine an alternative mapped frequency combination corresponding to a smallest error value as the target frequency combination.

Optionally, the second determination sub-module includes:

a fourth determination sub-module, configured to determine a first tactile intensity corresponding to the alternative mapped frequency combination according to the alternative mapped frequency combination and the corresponding relationship;

a fifth determination sub-module, configured to determine a mean square error between the first tactile intensity and the tactile intensity reference value as a first mean square error;

a sixth determination sub-module, configured to determine a mean squared error between the alternative mapped frequency combination and the frequency reference value as a second mean squared error; and a seventh determination sub-module, configured to determine the error value of the alternative mapped frequency combination based on a sum of the first mean squared error and the second mean squared error.

Optionally, the frequency reference is a resonant frequency of the tactile feedback device.

Optionally, the alternative mapped frequency combination is determined by:

a fourth determination module, configured to, according to the corresponding relationship between the tactile intensity and the frequency, determine a plurality of frequencies capable of uniformly distributing the tactile intensity as the alternative mapped frequency combination; or, a fifth determination module, configured to, according to a resonance frequency of the tactile feedback device, determine a target frequency interval including the resonance frequency, and determine a set of frequencies from the target frequency interval as the alternative mapped frequency combination.

Optionally, the second determination module 22 includes:

a dividing sub-module, configured to divide the target frequency domain signal into a plurality of sub-bands;

an eighth determination sub-module, configured to determine an instantaneous energy value of each of the sub-bands;

a filtering sub-module, configured to for perform mean filtering processing on the instantaneous energy value of the sub-band to obtain a filtered energy value of each of the sub-bands; and a normalizing sub-module, configured to normalize the filtered energy value to obtain the target energy value of each of the sub-bands.

Optionally, the processing module 24 includes:

a mapping sub-module, configured to map a target energy value of each of the sub-bands to a tactile signal component based on the target frequency combination; and a superimposing sub-module, configured to superimpose the tactile signal component to obtain the target tactile signal for tactile feedback.

Optionally, the mapping sub-module is configured to, for a target energy value of each of the sub-bands, according to the target energy value and a target frequency corresponding to the target energy value in the target frequency combination, generate a sine wave signal having a frequency of the target frequency and an energy of the target energy value as the tactile signal component corresponding to the target energy value.

With respect to the apparatus in the above-described embodiments, the specific manner in which the respective modules perform the operations has been described in detail in the method embodiments, which will not be elaborated here.

Referring to FIG. 3, FIG. 3 illustrates a schematic structural diagram of an electronic device 600 suitable for implementing some embodiments of the present disclosure. The electronic device in some embodiments of the present disclosure may include but are not limited to mobile terminals such as a mobile phone, a notebook computer, a digital broadcasting receiver, a personal digital assistant (PDA), a portable Android device (PAD), a portable media player (PMP), a vehicle-mounted terminal (e.g., a vehicle-mounted navigation terminal), a wearable electronic device or the like, and fixed terminals such as a digital TV, a desktop computer, or the like. The electronic device illustrated in FIG. 3 is merely an example, and should not pose any limitation to the functions and the range of use of the embodiments of the present disclosure.

As illustrated in FIG. 3, the electronic device 600 may include a processing apparatus 601 (e.g., a central processing unit, a graphics processing unit, etc.), which can perform various suitable actions and processing according to a program stored in a read-only memory (ROM) 602 or a program loaded from a storage apparatus 608 into a random-access memory (RAM) 603. The RAM 603 further stores various programs and data required for operations of the electronic device 600. The processing apparatus 601, the ROM 602, and the RAM 603 are interconnected by means of a bus 604. An input/output (I/O) interface 605 is also connected to the bus 604.

Usually, the following apparatus may be connected to the I/O interface 605: an input apparatus 606 including, for example, a touch screen, a touch pad, a keyboard, a mouse, a camera, a microphone, an accelerometer, a gyroscope, or the like; an output apparatus 607 including, for example, a liquid crystal display (LCD), a loudspeaker, a vibrator, or the like; a storage apparatus 608 including, for example, a magnetic tape, a hard disk, or the like; and a communication apparatus 609. The communication apparatus 609 may allow the electronic device 600 to be in wireless or wired communication with other devices to exchange data. While FIG. 3 illustrates the electronic device 600 having various apparatuses, it should be understood that not all of the illustrated apparatuses are necessarily implemented or included. More or fewer apparatuses may be implemented or included alternatively.

Particularly, according to some embodiments of the present disclosure, the processes described above with reference to the flowcharts may be implemented as a computer software program. For example, some embodiments of the present disclosure include a computer program product, which includes a computer program carried by a non-transitory computer-readable medium. The computer program includes program codes for performing the methods shown in the flowcharts. In such embodiments, the computer program may be downloaded online through the communication apparatus 609 and installed, or may be installed from the storage apparatus 608, or may be installed from the ROM 602. When the computer program is executed by the processing apparatus 601, the above-mentioned functions defined in the methods of some embodiments of the present disclosure are performed.

It should be noted that the above-mentioned computer-readable medium in the present disclosure may be a computer-readable signal medium or a computer-readable storage medium or any combination thereof. For example, the computer-readable storage medium may be, but not limited to, an electric, magnetic, optical, electromagnetic, infrared, or semiconductor system, apparatus or device, or any combination thereof. More specific examples of the computer-readable storage medium may include but not be limited to: an electrical connection with one or more wires, a portable computer disk, a hard disk, a random-access memory (RAM), a read-only memory (ROM), an erasable programmable read-only memory (EPROM or flash memory), an optical fiber, a compact disk read-only memory (CD-ROM), an optical storage device, a magnetic storage device, or any appropriate combination of them. In the present disclosure, the computer-readable storage medium may be any tangible medium containing or storing a program that can be used by or in combination with an instruction execution system, apparatus or device. In the present disclosure, the computer-readable signal medium may include a data signal that propagates in a baseband or as a part of a carrier and carries computer-readable program codes. The data signal propagating in such a manner may take a plurality of forms, including but not limited to an electromagnetic signal, an optical signal, or any appropriate combination thereof. The computer-readable signal medium may also be any other computer-readable medium than the computer-readable storage medium. The computer-readable signal medium may send, propagate or transmit a program used by or in combination with an instruction execution system, apparatus or device. The program code contained on the computer-readable medium may be transmitted by using any suitable medium, including but not limited to an electric wire, a fiber-optic cable, radio frequency (RF) and the like, or any appropriate combination of them.

In some implementation modes, the client and the server may communicate with any network protocol currently known or to be researched and developed in the future such as hypertext transfer protocol (HTTP), and may communicate (via a communication network) and interconnect with digital data in any form or medium. Examples of communication networks include a local area network (LAN), a wide area network (WAN), the Internet, and an end-to-end network (e.g., an ad hoc end-to-end network), as well as any network currently known or to be researched and developed in the future.

The above-mentioned computer-readable medium may be included in the above-mentioned electronic device, or may also exist alone without being assembled into the electronic device.

The above-mentioned computer-readable medium carries one or more programs, and when the one or more programs are executed by the electronic device, the electronic device is caused to: determine a target frequency domain signal corresponding to a target audio signal to be processed; divide the target frequency domain signal into a plurality of sub-bands, and determining a target energy value of each of the sub-bands; determine, from a plurality of alternative mapped frequency combinations, a target frequency combination that is capable of achieving a best tactile feedback effect on a tactile feedback device; and obtain a tactile feedback signal for tactile feedback according to the target frequency combination.

The computer program codes for performing the operations of the present disclosure may be written in one or more programming languages or a combination thereof. The above-mentioned programming languages include but are not limited to object-oriented programming languages such as Java, Smalltalk, C++, and also include conventional procedural programming languages such as the "C" programming language or similar programming languages. The program code may be executed entirely on the user's computer, partly on the user's computer, as a stand-alone software package, partly on the user's computer and partly on a remote computer, or entirely on the remote computer or server. In the scenario related to the remote computer, the remote computer may be connected to the user's computer through any type of network, including a local area network (LAN) or a wide area network (WAN), or the connection may be made to an external computer (for example, through the Internet using an Internet service provider).

The flowcharts and block diagrams in the accompanying drawings illustrate the architecture, functionality, and operation of possible implementations of systems, methods, and computer program products according to various embodiments of the present disclosure. In this regard, each block in the flowcharts or block diagrams may represent a module, a program segment, or a portion of codes, including one or more executable instructions for implementing specified logical functions. It should also be noted that, in some alternative implementations, the functions noted in the blocks may also occur out of the order noted in the accompanying drawings. For example, two blocks shown in succession may, in fact, can be executed substantially concurrently, or the two blocks may sometimes be executed in a reverse order, depending upon the functionality involved. It should also be noted that, each block of the block diagrams and/or flowcharts, and combinations of blocks in the block diagrams and/or flowcharts, may be implemented by a dedicated hardware-based system that performs the specified functions or operations, or may also be implemented by a combination of dedicated hardware and computer instructions.

The modules or units involved in the embodiments of the present disclosure may be implemented in software or hardware. Among them, the name of the module or unit does not constitute a limitation of the unit itself under certain circumstances. For example, the first determination module may also be described as a module for determining the target frequency domain signal corresponding to the target audio signal to be processed.

The functions described herein above may be performed, at least partially, by one or more hardware logic components. For example, without limitation, available exemplary types of hardware logic components include: a field programmable gate array (FPGA), an application specific integrated circuit (ASIC), an application specific standard product (ASSP), a system on chip (SOC), a complex programmable logical device (CPLD), etc.

In the context of the present disclosure, the machine-readable medium may be a tangible medium that may include or store a program for use by or in combination with an instruction execution system, apparatus or device. The machine-readable medium may be a machine-readable signal medium or a machine-readable storage medium. The machine-readable medium includes, but is not limited to, an electrical, magnetic, optical, electromagnetic, infrared, or semi-conductive system, apparatus or device, or any suitable combination of the foregoing. More specific examples of machine-readable storage medium include electrical connection with one or more wires, portable computer disk, hard disk, random-access memory (RAM), read-only memory (ROM), erasable programmable read-only memory (EPROM or flash memory), optical fiber, portable compact disk read-only memory (CD-ROM), optical storage device, magnetic storage device, or any suitable combination of the foregoing.

According to one or more embodiments of the present disclosure, a tactile signal generation method is provided, the method includes:

determining a target frequency domain signal corresponding to a target audio signal to be processed;

dividing the target frequency domain signal into a plurality of sub-bands, and determining a target energy value of each of the sub-bands;

determining, from a plurality of alternative mapped frequency combinations, a target frequency combination capable of achieving the best tactile feedback effect on a tactile feedback device; and obtaining a tactile feedback signal for tactile feedback according to the target frequency combination.

According to one or more embodiments of the present disclosure, a tactile signal generation method is provided, in which the determining, from a plurality of alternative mapped frequency combinations, a target frequency combination capable of achieving a best tactile feedback effect on a tactile feedback device includes:

obtaining sample data, in which the sample data comprises a tactile intensity reference value and a frequency reference value determined based on a plurality of audio signal samples;

determining a corresponding relationship between a tactile intensity and a frequency;

for each of the alternative mapped frequency combinations, determining an error value of the alternative mapped frequency combination based on the frequency reference value, the tactile intensity reference value, and the corresponding relationship; and determining an alternative mapped frequency combination corresponding to a smallest error value as the target frequency combination.

According to one or more embodiments of the present disclosure, a tactile signal generation method is provided, in which the determining an error value of the alternative mapped frequency combination based on the frequency reference value, the tactile intensity reference value includes:

determining a first tactile intensity corresponding to the alternative mapped frequency combination according to the alternative mapped frequency combination and the corresponding relationship;

determining a mean square error between the first tactile intensity and the tactile intensity reference value as a first mean square error;

determining a mean squared error between the alternative mapped frequency combination and the frequency reference value as a second mean squared error; and determining the error value of the alternative mapped frequency combination based on a sum of the first mean squared error and the second mean squared error.

According to one or more embodiments of the present disclosure, a tactile signal generation method is provided, in which the frequency reference value is a resonance frequency of the tactile feedback device.

According to one or more embodiments of the present disclosure, a tactile signal generation method is provided, in which the alternative mapped frequency combination is determined by:

according to the corresponding relationship between the tactile intensity and the frequency, determining a plurality of frequencies capable of uniformly distributing the tactile intensity as the alternative mapped frequency combination; or according to a resonance frequency of the tactile feedback device, determining a target frequency interval comprising the resonance frequency, and determining a set of frequencies from the target frequency interval as the alternative mapped frequency combination.

According to one or more embodiments of the present disclosure, a tactile signal generation method is provided, in which the dividing the target frequency domain signal into a plurality of sub-bands, and determining a target energy value of each of the sub-bands includes:

dividing the target frequency domain signal into a plurality of sub-bands;

determining an instantaneous energy value of each of the sub-bands;

performing mean filtering processing on the instantaneous energy value of the sub-band to obtain a filtered energy value of each of the sub-bands; and normalizing the filtered energy value to obtain the target energy value of each of the sub-bands.

According to one or more embodiments of the present disclosure, a tactile signal generation method is provided, in which the obtaining a tactile feedback signal for tactile feedback according to the target frequency combination includes: mapping a target energy value of each of the sub-bands to a tactile signal component based on the target frequency combination; and superimposing the tactile signal component to obtain the target tactile signal for tactile feedback.

According to one or more embodiments of the present disclosure, a tactile signal generation method is provided, in which the mapping a target energy value of each of the sub-bands to a tactile signal component based on the target frequency combination includes:

for a target energy value of each of the sub-bands, according to the target energy value and a target frequency corresponding to the target energy value in the target frequency combination, generating a sine wave signal having a frequency of the target frequency and an energy of the target energy value as the tactile signal component corresponding to the target energy value.

According to one or more embodiments of the present disclosure, a tactile signal generation apparatus is provided, the apparatus includes:

a first determination module, configured to determine a target frequency domain signal corresponding to a target audio signal to be processed;

a second determination module, configured to divide the target frequency domain signal into a plurality of sub-bands, and determine a target energy value of each of the sub-bands;

a third determination module, configured to determine, from a plurality of alternative mapped frequency combinations, a target frequency combination capable of achieving a best tactile feedback effect on a tactile feedback device; and a processing module, configured to obtain a tactile feedback signal for tactile feedback according to the target frequency combination.

According to one or more embodiments of the present disclosure, a computer readable medium is provided, the medium stores a computer program thereon, the computer program, when executed by a processing device, implements the steps of the tactile signal generation method provided by the embodiments of the present disclosure.

According to one or more embodiments of the present disclosure, an electronic device is provided, the device includes:

a storage apparatus, storing at least one computer program thereon; and at least one processing apparatus, configured to execute the at least one computer program in the storage apparatus to implement the steps of the tactile signal generation method provided by the embodiments of the present disclosure.

The foregoing are merely descriptions of the preferred embodiments of the present disclosure and the explanations of the technical principles involved. It will be appreciated by those skilled in the art that the scope of the disclosure involved herein is not limited to the technical solutions formed by a specific combination of the technical features described above, and shall cover other technical solutions formed by any combination of the technical features described above or equivalent features thereof without departing from the concept of the present disclosure. For example, the technical features described above may be mutually replaced with the technical features having similar functions disclosed herein (but not limited thereto) to form new technical solutions.

In addition, while operations have been described in a particular order, it shall not be construed as requiring that such operations are performed in the stated specific order or sequence. Under certain circumstances, multitasking and parallel processing may be advantageous. Similarly, while some specific implementation details are included in the above discussions, these shall not be construed as limitations to the present disclosure. Some features described in the context of a separate embodiment may also be combined in a single embodiment. Rather, various features described in the context of a single embodiment may also be implemented separately or in any appropriate sub-combination in a plurality of embodiments.

Although the present subject matter has been described in a language specific to structural features and/or logical method acts, it will be appreciated that the subject matter defined in the appended claims is not necessarily limited to the particular features and acts described above. Rather, the particular features and acts described above are merely exemplary forms for implementing the claims. Specific manners of operations performed by the modules in the apparatus in the above embodiment have been described in detail in the embodiments regarding the method, which will not be explained and described in detail herein again.

The invention claimed is:

1. A tactile signal generation method, comprising:

determining a target frequency domain signal corresponding to a target audio signal to be processed; dividing the target frequency domain signal into a plurality of sub-bands, and determining a target energy value of each of the sub-bands; determining, from a plurality of alternative mapped frequency combinations, a target frequency combination for achieving a best tactile feedback effect on a tactile feedback device; and obtaining a tactile feedback signal for tactile feedback according to the target frequency combination.

2. The method according to claim 1, wherein the determining, from a plurality of alternative mapped frequency combinations, a target frequency combination for achieving the best tactile feedback effect on a tactile feedback device comprises: obtaining sample data, wherein the sample data comprises a tactile intensity reference value and a frequency reference value determined based on a plurality of audio signal samples; determining a corresponding relationship between a tactile intensity and a frequency; for each of the alternative mapped frequency combinations, determining an error value of the alternative mapped frequency combination based on the frequency reference value, the tactile intensity reference value, and the corresponding relationship; and determining an alternative mapped frequency combination corresponding to a smallest error value as the target frequency combination.

3. The method according to claim 2, wherein the determining an error value of the alternative mapped frequency combination based on the frequency reference value, the tactile intensity reference value comprises:

determining a first tactile intensity corresponding to the alternative mapped frequency combination according to the alternative mapped frequency combination and the corresponding relationship;

determining a mean square error between the first tactile intensity and the tactile intensity reference value as a first mean square error;

determining a mean squared error between the alternative mapped frequency combination and the frequency reference value as a second mean squared error; and determining the error value of the alternative mapped frequency combination based on a sum of the first mean squared error and the second mean squared error.

4. The method according to claim 3, wherein the frequency reference value is a resonance frequency of the tactile feedback device.

5. The method according to claim 3, wherein the alternative mapped frequency combination is determined by: according to the corresponding relationship between the tactile intensity and the frequency, determining a plurality of frequencies to uniformly distributing the tactile intensity as the alternative mapped frequency combination; or according to a resonance frequency of the tactile feedback device, determining a target frequency interval comprising the resonance frequency, and determining a set of frequencies from the target frequency interval as the alternative mapped frequency combination.

6. The method according to claim 2, wherein the frequency reference value is a resonance frequency of the tactile feedback device.

7. The method according to claim 2, wherein the alternative mapped frequency combination is determined by: according to the corresponding relationship between the tactile intensity and the frequency, determining a plurality of frequencies to uniformly distributing the tactile intensity as the alternative mapped frequency combination; or according to a resonance frequency of the tactile feedback device, determining a target frequency interval comprising the resonance frequency, and determining a set of frequencies from the target frequency interval as the alternative mapped frequency combination.

8. The method according to claim 1, wherein the dividing the target frequency domain signal into a plurality of sub-bands, and determining a target energy value of each of the sub-bands comprises:

dividing the target frequency domain signal into a plurality of sub-bands;

determining an instantaneous energy value of each of the sub-bands;

performing mean filtering processing on the instantaneous energy value of the sub-band to obtain a filtered energy value of each of the sub-bands; and normalizing the filtered energy value to obtain the target energy value of each of the sub-bands.

9. The method according to claim 1, wherein the obtaining a tactile feedback signal for tactile feedback according to the target frequency combination comprises:

mapping a target energy value of each of the sub-bands to a tactile signal component based on the target frequency combination; and superimposing the tactile signal component to obtain the target tactile signal for tactile feedback.

10. The method according to claim 9, wherein the mapping the target energy value of each of the sub-bands to the tactile signal component based on the target frequency combination comprises: for a target energy value of each of the sub-bands, according to the target energy value and a target frequency corresponding to the target energy value in the target frequency combination, generating a sine wave signal having a frequency of the target frequency and an energy of the target energy value as the tactile signal component corresponding to the target energy value.

11. A non-transitory computer readable medium, storing a computer program thereon, wherein the computer program, when executed by a processing device, implements a tactile signal generation method, the method comprises:

determining a target frequency domain signal corresponding to a target audio signal to be processed;

dividing the target frequency domain signal into a plurality of sub-bands, and determining a target energy value of each of the sub-bands;

determining, from a plurality of alternative mapped frequency combinations, a target frequency combination capable of achieving a best tactile feedback effect on a tactile feedback device; and obtaining a tactile feedback signal for tactile feedback according to the target frequency combination.

12. An electronic device, comprising:

a storage apparatus, storing at least one computer program thereon; and at least one processing apparatus, configured to execute the at least one computer program in the storage apparatus to:

determine a target frequency domain signal corresponding to a target audio signal to be processed;

divide the target frequency domain signal into a plurality of sub-bands, and determining a target energy value of each of the sub-bands;

determine, from a plurality of alternative mapped frequency combinations, a target frequency combination for achieving a best tactile feedback effect on a tactile feedback device; and obtain a tactile feedback signal for tactile feedback according to the target frequency combination.

13. The device according to claim 12, wherein the at least one processing apparatus is further to:

obtain sample data, wherein the sample data comprises a tactile intensity reference value and a frequency reference value determined based on a plurality of audio signal samples;

determine a corresponding relationship between a tactile intensity and a frequency;

for each of the alternative mapped frequency combinations, determine an error value of the alternative mapped frequency combination based on the frequency reference value, the tactile intensity reference value, and the corresponding relationship; and determine an alternative mapped frequency combination corresponding to a smallest error value as the target frequency combination.

14. The device according to claim 13, wherein the at least one processing apparatus is further to:

determine a first tactile intensity corresponding to the alternative mapped frequency combination according to the alternative mapped frequency combination and the corresponding relationship;

determine a mean square error between the first tactile intensity and the tactile intensity reference value as a first mean square error;

determine a mean squared error between the alternative mapped frequency combination and the frequency reference value as a second mean squared error; and determine the error value of the alternative mapped frequency combination based on a sum of the first mean squared error and the second mean squared error.

15. The device according to claim 13, wherein the frequency reference value is a resonance frequency of the tactile feedback device.

16. The device according to claim 13, wherein the alternative mapped frequency combination is determined by: according to the corresponding relationship between the tactile intensity and the frequency, determining a plurality of frequencies to uniformly distributing the tactile intensity as the alternative mapped frequency combination; or according to a resonance frequency of the tactile feedback device, determining a target frequency interval comprising the resonance frequency, and determining a set of frequencies from the target frequency interval as the alternative mapped frequency combination.

17. The device according to claim 12, wherein the at least one processing apparatus is further to: divide the target frequency domain signal into the plurality of sub-bands; determine an instantaneous energy value of each of the sub-bands; perform mean filtering processing on the instantaneous energy value of the sub-band to obtain a filtered energy value of each of the sub-bands; and normalize the filtered energy value to obtain the target energy value of each of the sub-bands.

18. The device according to claim 12, wherein the at least one processing apparatus is further to:

map a target energy value of each of the sub-bands to a tactile signal component based on the target frequency combination; and superimpose the tactile signal component to obtain the target tactile signal for tactile feedback.

19. The device according to claim 18, wherein the at least one processing apparatus is further to:

for a target energy value of each of the sub-bands, according to the target energy value and a target frequency corresponding to the target energy value in the target frequency combination, generate a sine wave signal having a frequency of the target frequency and an energy of the target energy value as the tactile signal component corresponding to the target energy value.

\* \* \* \* \*